United States Patent
Xiao et al.

(10) Patent No.: US 11,290,185 B2
(45) Date of Patent: Mar. 29, 2022

(54) REMOTE OPTICAL FIBER DISPERSION COMPENSATION DEVICE AND METHOD, REMOTE ACCESS DEVICE, ELECTRONIC DEVICE AND NON-TRANSIENT COMPUTER-READABLE STORAGE MEDIUM

(71) Applicant: Accelink Technologies Co., Ltd, Wuhan (CN)

(72) Inventors: Li Xiao, Wuhan (CN); Weiqing Zhang, Wuhan (CN); Qinlian Bu, Wuhan (CN); Chengpeng Fu, Wuhan (CN); Zhi Chen, Wuhan (CN); Lijie Qiao, Wuhan (CN)

(73) Assignee: Accelink Technologies Co., Ltd

( * ) Notice: Subject to any disclaimer, the term of this patent is extended or adjusted under 35 U.S.C. 154(b) by 0 days.

(21) Appl. No.: 17/264,523

(22) PCT Filed: Dec. 25, 2018

(86) PCT No.: PCT/CN2018/123440
§ 371 (c)(1),
(2) Date: Jun. 11, 2021

(87) PCT Pub. No.: WO2020/024543
PCT Pub. Date: Feb. 6, 2020

(65) Prior Publication Data
US 2021/0328671 A1  Oct. 21, 2021

(30) Foreign Application Priority Data

Aug. 1, 2018  (CN) .......................... 201810860705.9

(51) Int. Cl.
 *H04B 10/2525* (2013.01)
(52) U.S. Cl.
 CPC .............................. *H04B 10/25253* (2013.01)

(58) Field of Classification Search
None
See application file for complete search history.

(56) References Cited

U.S. PATENT DOCUMENTS

2016/0028503 A1* 1/2016 Costantini ............. H04J 14/021
  398/34
2017/0272161 A1* 9/2017 Kai ....................... H04B 10/079

FOREIGN PATENT DOCUMENTS

| CN | 101697499 A | * | 4/2010 | ....... H04B 10/25133 |
| CN | 101697499 A | | 4/2010 | |

(Continued)

OTHER PUBLICATIONS

Chinese Search Report for Application No. 201810860705.9, dated Apr. 24, 2019, 1 page.

*Primary Examiner* — David W Lambert
(74) *Attorney, Agent, or Firm* — Lerner, David, Littenberg, Krumholz & Mentlik, LLP (57) ABSTRACT

Provided by the embodiments of the present invention are a remote optical fiber dispersion compensation device and method, the dispersion compensation device comprising: a distance measurement module, used for measuring a remote distance to a remote access optical fiber; a channel monitoring module, used for monitoring the spectral power of a transmission service wavelength channel; and a remote optical fiber dispersion power equalization module, used for compensating the dispersion of a transmission service signal and adjusting the insertion loss of the wavelength channel according to the measured remote distance of the remote access optical fiber and the monitored spectral power of the transmission service wavelength channel. By employing the embodiments of the present invention, compensation amounts of different channels may be flexibly selected by means of a wavelength selection switch, dispersion may be compensated for remote optical fiber transmission and the (Continued)

insertion loss may be adjusted for different channels by presetting dispersion compensation optical fibers of different lengths, thus achieving compensation and equalization of dispersion and power difference introduced by remote optical fibers of different lengths.

8 Claims, 4 Drawing Sheets

(56) References Cited

FOREIGN PATENT DOCUMENTS

| | | |
|---|---|---|
| CN | 101719798 A | 6/2010 |
| CN | 104320192 A | 1/2015 |
| CN | 109067463 A | 12/2018 |

* cited by examiner

| S1 | Measuring remote distances of remotely accessed optical fibers and monitoring spectral powers of wavelength channels of transmission services |

| S2 | Performing dispersion compensation on transmission service signals and performing insertion loss adjustment on spectral powers of channel wavelengths according to measured remote distances of remote access optical fibers and monitored spectral powers of wavelength channels of transmission services |

FIG. 4

FIG. 5 ly at the device, and the remote distance is 0; and some optical channels may be generated outside of 10 kilometers, connected to the local device through the optical fiber, and multiplexed with local services at the optical wavelength level and transmitted to a data center of an upper level.

REMOTE OPTICAL FIBER DISPERSION COMPENSATION DEVICE AND METHOD, REMOTE ACCESS DEVICE, ELECTRONIC DEVICE AND NON-TRANSIENT COMPUTER-READABLE STORAGE MEDIUM

CROSS-REFERENCE TO RELATED APPLICATIONS

The present application is a national phase entry under 35 U.S.C § 371 of International Application No. PCT/CN2018/123440 filed Dec. 25, 2018, which claims priority from Chinese Application No. 201810860705.9 filed Aug. 1, 2018, all of which are hereby incorporated herein by reference.

TECHNICAL FIELD

The embodiments of the present disclosure relate to the technical field of optical fiber communication, and in particular to a method and a device of remote optical fiber dispersion compensation.

BACKGROUND

In an optical fiber access network, different access wavelength channels may be generated at different physical locations and there are different remote distances from a convergence device. Some optical channels may be generated locally at the device, and the remote distance is 0; and some optical channels may be generated outside of 10 kilometers, connected to the local device through the optical fiber, and multiplexed with local services at the optical wavelength level and transmitted to a data center of an upper level.

At present, an optical signal modulated by the PAM4 format is widely used in the optical fiber access network, and has the advantage of bearing higher service capacity with low baud rate. However, this modulation format requires harsh residual dispersion requirements on the transmission channel and can only tolerate residual dispersion of about +/−50 ps/nm. If the remote distance difference of different wavelengths is 10 km, and if it is calculated by using a common single-mode optical fiber of 17 ps/nm/km, no matter how dispersion compensation is performed in a link, it will not be possible to make all channels meet the requirements of residual dispersion at the same time. In addition, in the prior art, for the remote service, a photoelectric light mode is adopted, the remote service is converted into an electric signal locally at the device and modulated on the local optical transceiver module, so that all the optical signals are locally and synchronously terminated and generated, which requires additional device and management. In addition, in the prior art, the individual dispersion compensation can also be performed with respect to the remote distance of each wavelength channel. This requires a large number of dispersion compensation modules and additional manual operations.

Therefore, how to equalize the dispersion difference generated by the different lengths of the remote optical fibers so as to make all the optical wavelength channels meet the dispersion requirement has become an urgent problem to be solved.

SUMMARY OF THE INVENTION

In allusion to the existing technical problems, the embodiments of the present disclosure provide a remote optical fiber dispersion compensation method and device.

In one aspect, the embodiment of the present disclosure provides a remote optical fiber dispersion compensation device, characterized in comprising:

a distance measurement module, which is used for measuring remote distances to remote access optical fibers; a channel monitoring module, which is used for monitoring spectral powers of transmission service wavelength channels; and a remote optical fiber dispersion power equalization module, which is used for performing dispersion compensation on transmission service signals and performing insertion loss adjustment on wavelength channels according to measured remote distances of the remote access optical fibers and monitored spectral powers of the transmission service wavelength channels.

In addition, the remote optical fiber dispersion power equalization module comprises a wavelength selection switch and N dispersion compensation optical fibers preset with different lengths, wherein the wavelength selection switch divides the wavelength channels for transmitting services into N groups according to the remote distances of the remotely accessed optical fibers, and inputs transmission service signals of N groups of wavelength channels to the N dispersion compensation optical fibers preset with different lengths to perform remote optical fiber dispersion compensation for transmission service signals, wherein N is an integer greater than 1.

In addition, the remote optical fiber dispersion power equalization module comprises a wavelength selection switch, and the channel monitoring module inputs the monitored spectral powers of the wavelength channels to the wavelength selection switch to perform insertion loss adjustment on the channels.

In addition, the wavelength selection switch is a 1×N wavelength selection switch, the wavelength selection switch distributes transmission service signals of the N groups of wavelength channels to N ports, and the N dispersion compensation optical fibers preset with different lengths are connected with N ports of the wavelength selection switch to perform dispersion compensation for the transmission service signals.

In addition, the remote optical fiber dispersion power equalization module comprises an uplink module and a downlink module, wherein the uplink module includes a first amplifier, a first optical circulator, a first 1×N wavelength selection switch, a first N dispersion compensation optical fibers preset with different lengths, and a second amplifier, wherein uplink transmission service signals are injected into the first 1×N wavelength selection switch through the first optical circulator after passing through the first amplifier, and the uplink transmission service signals are reflected back to the first wavelength selection switch after being performed dispersion compensation by the first N dispersion compensation optical fibers preset with different lengths, and then are injected into the second amplifier through the first optical circulator; and the downlink module includes a third amplifier, a second optical circulator, a second 1×N wavelength selection switch, a second N dispersion compensation optical fibers preset with different lengths, and a fourth amplifier, wherein downlink transmission service signals are injected into the second 1×N wavelength selection switch through the second optical circulator after passing through the third amplifier, and the downlink transmission service signals are reflected back to the second 1×N wavelength selection switch after being performed dispersion compensation by the second N dispersion compensation optical fibers preset with different lengths, and then are injected into the fourth amplifier through the second optical circulator.

In another aspect, the embodiment of the present disclosure provides a remote access device, which comprises:

a multiplexer, a first link power dispersion compensation module, a second link power dispersion compensation module, a demultiplexer, and a first remote optical fiber dispersion compensation device and a second remote optical fiber dispersion compensation device according to claims 1 to 5, the first remote optical fiber dispersion compensation device being located between the multiplexer and the first link power dispersion compensation device, the second remote optical fiber dispersion compensation device being located between a demultiplexer and a second link power dispersion compensation device, wherein, the multiplexer is used for multiplexing the uplink transmission service signals to generate multiplexed service signals; the multiplexed service signals are performed dispersion compensation and power equalization of remote distances of different channels after passing the first remote optical fiber dispersion compensation device, and the first link power dispersion compensation device performs uniform dispersion compensation and power equalization on the uplink transmission service signals;

the second link power dispersion compensation device performs uniform dispersion compensation and power equalization on the downlink transmission service signals, the downlink service transmission signals after being performed uniform dispersion compensation and power equalization are performed dispersion compensation and power equalization of the remote distances of different channels by the second remote optical fiber dispersion compensation device, and are then sent into the demultiplexer to demultiplex the downlink transmission services, so as to generate demultiplexed service signals.

In yet another aspect, the embodiment of the present disclosure provides a remote optical fiber dispersion compensation method, the method comprising: measuring remote distances of remotely accessed optical fibers and monitoring spectral powers of transmission service wavelength channels; and performing dispersion compensation on signals of different remote distances and performing insertion loss adjustment on the channels according to the measured remote distances of the remote access optical fibers and the monitored spectral powers of the transmission service wavelength channels.

In addition, the performing remote optical fiber dispersion compensation on transmission services comprises: dividing wavelength channels for transmitting services into N groups according to the remote distances of the remotely accessed optical fibers, and inputting transmission service signals of N groups of wavelength channels to the N dispersion compensation optical fibers preset with different lengths to perform dispersion compensation for transmission service signals, wherein N is an integer greater than 1.

In yet another aspect, the embodiment of the present disclosure further provides an electronic device, which comprises a memory, a processor, and a computer program stored in the memory and capable of operating on the processor, the processor implementing the above mentioned remote optical fiber dispersion compensation method when executing the program.

In yet another aspect, the embodiment of the present disclosure further provides a non-transient computer-readable storage medium having a computer program stored thereon, the computer program implementing the above mentioned remote optical fiber dispersion compensation method when being executed by a processor.

In the embodiment of the present disclosure, by the wavelength selection switch, the compensation quantities of different channels are flexibly selected, by the dispersion compensation optical fibers preset with different lengths, the dispersion compensation is performed on the remote optical fiber transmission and the insertion loss adjustment is performed on different channel powers, and thus, compensation and equalization of dispersion and power difference introduced by different remote optical fiber lengths can be achieved.

BRIEF DESCRIPTION OF THE DRAWINGS

For a more clear description of the embodiments of the present disclosure or the technical solutions in the prior arts, the drawings to be used in the description of the embodiments or the prior arts will be briefly introduced below, and obviously, the drawings are only for some embodiments of the present disclosure, and those with ordinary skills in the art may obtain other drawings based on these drawings without paying inventive labor.

DETAILED DESCRIPTION

In order to make the objectives, technical solutions and advantages of the embodiments of the present disclosure more obvious, the technical solutions in the embodiments of the present disclosure will be clearly described below in conjunction with the accompanying drawings in the embodiments of the present disclosure, and obviously the described embodiments are a part of embodiments of the present disclosure but not all embodiments. Based on the embodiments of the present disclosure, all other embodiments obtained by those of ordinary skill in the art without inventive labor shall fall within the protection scope of the present disclosure.

Figure 1:
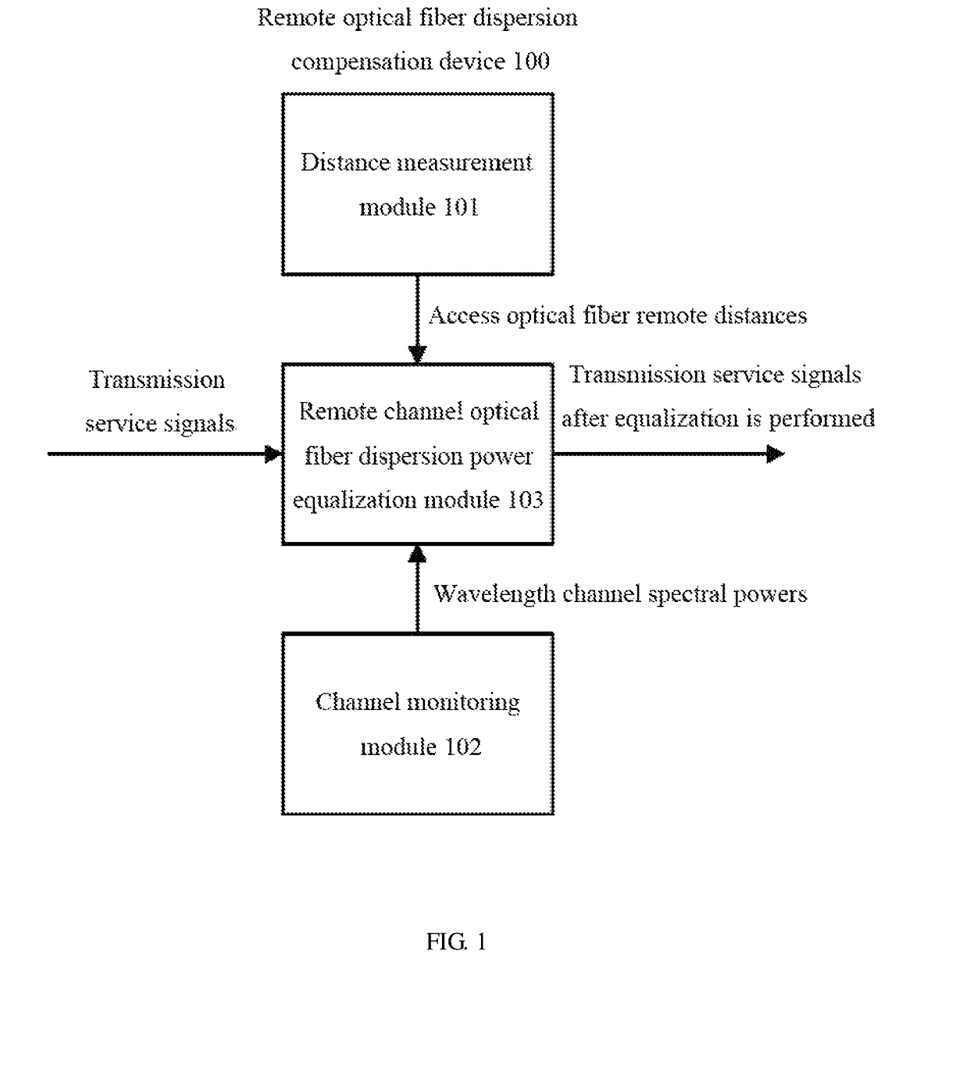
FIG. 1 is a schematic structural diagram of a remote optical fiber dispersion compensation device according to an embodiment of the present disclosure.

FIG. 1 shows a schematic structural diagram of a remote optical fiber dispersion compensation device 100 according to an embodiment of the present disclosure.

As shown in FIG. 1, a remote optical fiber dispersion compensation device 100 provided by the embodiments of the present disclosure comprises: a distance measurement module 101, used for measuring remote distances to remote access optical fibers; a channel monitoring module 102, used for monitoring spectral powers of transmission service wavelength channels; and a remote optical fiber dispersion power equalization module 103, used for performing remote optical fiber dispersion compensation on transmission service signals and performing insertion loss adjustment on the channels according to the measured remote distances of the remote access optical fibers and the monitored spectral powers of the wavelength channels of the transmission services.

In particular, taking a remote access uplink transmission service as an example, the embodiment of the present disclosure multiplexes the remote access uplink services through a multiplexer, since the optical fibers used for the remotely accessed uplink service transmissions have different remote distances, in the embodiment of the present disclosure, the distance measurement module 101 is used to measure the remote access optical fiber remote distances, and the channel monitoring module 102 is used to measure the spectral powers of the wavelength channels of the uplink transmission services, and after the remotely accessed optical fiber remote distance values and the wavelength channel spectral power values are obtained, the remote optical fiber dispersion power equalization module 103 performs dispersion compensation of the uplink transmission service signals and performs insertion loss adjustment of the wavelength channel powers according to both of the optical fiber remote distance values and the wavelength channel spectral power values. In the actual measurement for the optical fiber remote distances, a tunable wavelength optical time domain reflectometer (Optical Time Domain Reflectometer; OTDR) can be used for passing through the multiplexer to measure the optical fiber remote distance of each wavelength channel, so as to select the dispersion compensation quantity appropriate for the wavelength service, and of course, in the actual operation process, other remote distance measurement methods of the remote access optical fibers can also be used in the embodiment of the present disclosure.

For the dispersion compensation of the uplink transmission service signals, the remote optical fiber dispersion power equalization module 103 divides the wavelength channels for transmitting the uplink services i.e. dividing into N groups, according to the remote distances of the remotely accessed optical fibers, then, the uplink service signals transmitted by the N groups of wavelength channels are input to the N dispersion compensation optical fibers DCF (Dispersion Compensating Fiber) with different preset lengths, and the preset lengths of the dispersion compensation fibers are different, i.e. the corresponding dispersion compensation capabilities are also different. The N dispersion compensation optical fibers perform dispersion compensation on the uplink transmission service signals born by the wavelength channels which are divided into N groups. Wherein, N is an integer greater than 1, and in actual dispersion compensation, N is generally of the types of 4 or 9, 20, etc., but it is not limited to the above types. The N dispersion compensation optical fibers preset with different lengths are used for compensating the residual dispersions of the uplink services caused by the different remote distances of the optical fibers, so that the uplink services can meet the residual dispersion requirements of PAM4 at the same time after being performed link integrated dispersion compensation. The more types of preset dispersion compensation optical fibers (the bigger the N), the smaller the residue of dispersion compensation.

Figure 2:
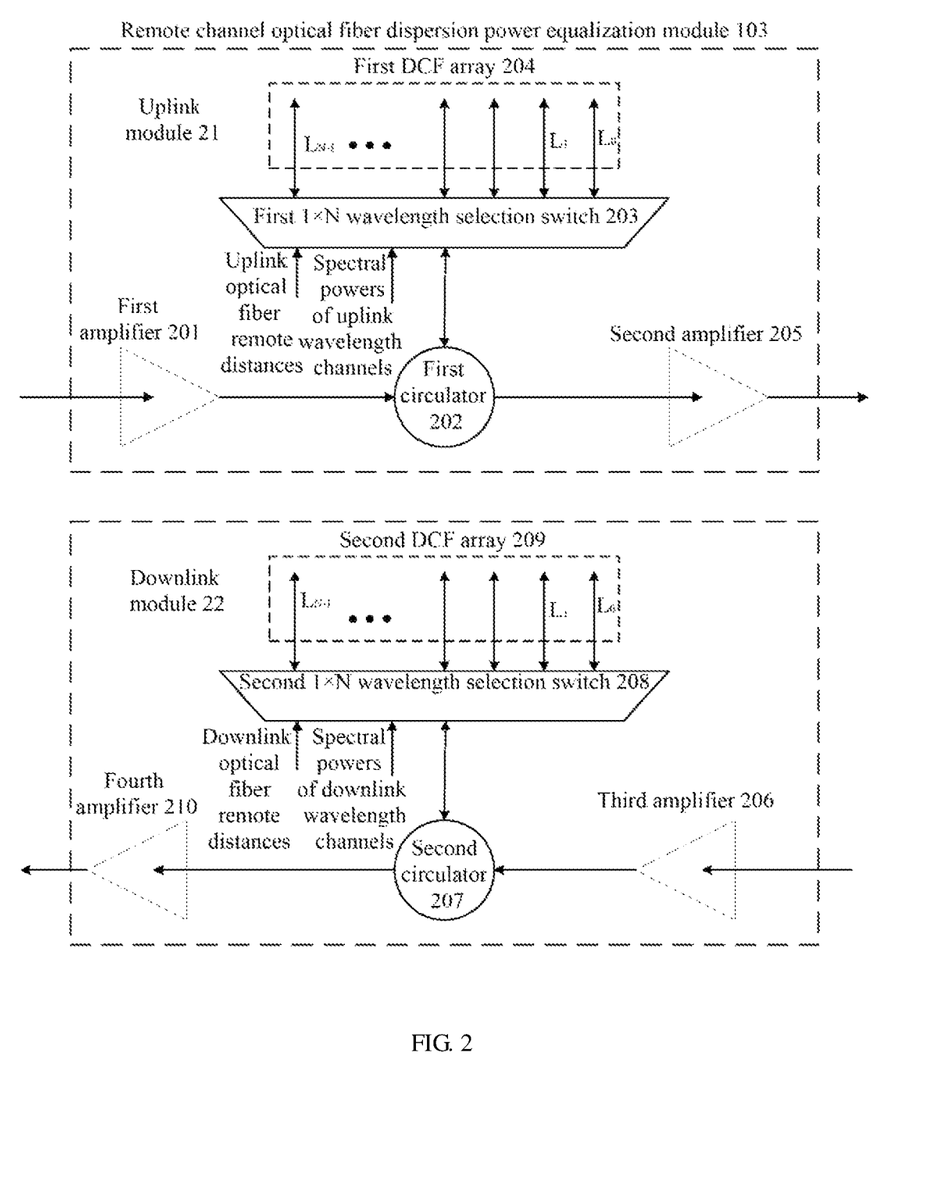
FIG. 2 is a schematic structural diagram of a remote optical fiber dispersion power equalization module according to an embodiment of the present disclosure.

In the embodiment of the present disclosure, the grouping for the wavelength channels are completed by the wavelength selection switch 203. As shown in FIG. 2, the remote optical fiber dispersion power equalization module 103 includes an uplink module 21 and a downlink module 22. For the uplink module 21, it includes a first 1×N wavelength selection switch (WSS) 203, having 1 input terminal and N output ports. According to the remote distances of the remote access optical fibers measured by the distance measurement module 101, the first 1×N WSS 203 divides the wavelength channels for transmitting uplink services into N groups, and distributes the service signals born by the N groups of uplink service wavelength channels to the N output ports of the first 1×N WSS 203. The N output ports of the first 1×N WSS 203 are connected with N dispersion compensation optical fibers DCF preset with different lengths, as shown in FIG. 2, the first DCF array 204 is composed of N DCFs preset with different lengths ($L_0, \ldots, L_{N-1}$ in FIG. 2), and the dispersion compensation of the transmission service signals is performed by N dispersion compensation optical fibers preset with different lengths.

As shown in FIG. 2, the remote optical fiber dispersion power equalization module 103 in the embodiment of the present disclosure may further include a first amplifier 201, a first optical circulator 202, a first 1×N wavelength selection switch (WSS) 203, a first N dispersion compensation optical fibers 204 preset with different lengths and a second amplifier 205, a third amplifier 206, a second optical circulator 207, a second 1×N wavelength selection switch (WSS) 208, a second N dispersion compensation optical fibers 208 preset with different lengths and a fourth amplifier 210.

Wherein, after passing through the first amplifier 201, the uplink services are injected into the 1×N wavelength selection switch (WSS) 203 through the first optical circulator 202, the first WSS 203 distributes the uplink services to N ports after completing the grouping for wavelength channels, and the first N dispersion compensation optical fibers (DCF) 204 with different lengths provide different extents of dispersion compensation ($L_0, \ldots, L_{N-1}$ in FIG. 2), then, the uplink service signals after dispersion compensation are totally reflected back to the first WSS 203, and are then injected into the second amplifier 205 from the output port of the first circulator 202 for power amplification. For example, taking a 1×4 WSS as an example, after passing through the second amplifier, the dispersion difference of different channels can be reduced to 42.5 ps/nm from the original 170 ps/nm, which can fully meet the residual dispersion requirements of the PAM4. The working principle of the downlink services is similar to that of the uplink services.

The channel monitoring module 102 is used for monitoring the spectrums of the wavelength channels of the transmission services, and the remote optical fiber dispersion power equalization module 103 performs insertion loss adjustment of the wavelength channel powers according to the spectral powers of the wavelength channels monitored by the channel monitoring module 102 at the output of the second amplifier 205.

The working principle of the downlink services in the dispersion compensation device 100 is the same as that of the uplink services. In particular, the distance measurement module 101 and the channel monitoring module 102 respectively measure the remote distances of the remote access optical fibers of the downlink services and monitor the spectral powers of the downlink transmission service wavelength channels at the output of the fourth amplifier 210, and the remote optical fiber dispersion power equalization module 103 performs dispersion compensation on the downlink transmission service signals and performs insertion loss adjustment on the channels according to the measured remote distances of the downlink remote access optical fibers and the monitored spectral powers of the wavelength channels of the downlink transmission services. As shown in FIG. 2, the downlink transmission service signals are injected into the second 1×N wavelength selection switch WSS 208 through the second optical circulator 207 after being performed power amplification by the third amplifier 206, and the downlink transmission service signals are reflected back to the second 1×N wavelength selection switch 208 after being performed dispersion compensation by the second N dispersion compensation optical fibers DCF array 209 preset with different lengths, and are then injected into the fourth amplifier 210 through the second optical circulator 209 for power amplification.

In the embodiment of the present disclosure, by the wavelength selection switch, the compensation quantities of different channels are flexibly selected, by the dispersion compensation optical fibers preset with different lengths, the remote optical fiber dispersion compensation is performed on the transmission service signals and the insertion loss adjustment is performed on different channels, and thus, compensation and equalization of dispersion and power difference introduced by remote optical fibers with different lengths can be achieved.

Figure 3:
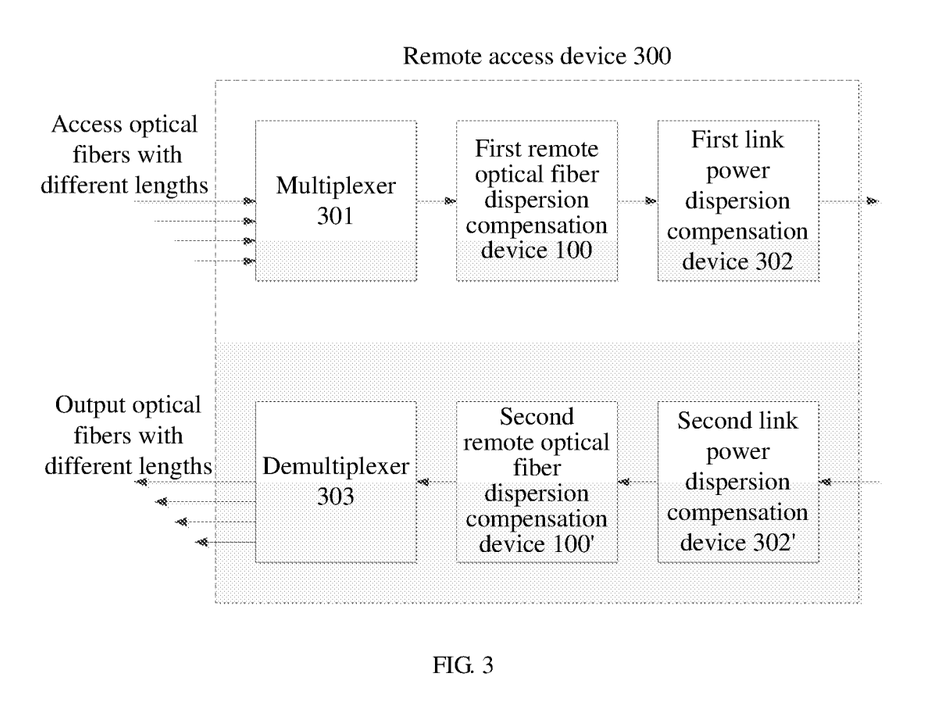
FIG. 3 is a schematic structural diagram of a remote access device according to yet another embodiment of the present disclosure.

FIG. 3 shows a schematic structural diagram of a remote access device according to yet another embodiment of the present disclosure.

As shown in FIG. 3, for the transmitted uplink services, the remote access device 300 includes: a multiplexer (Mux) 301, a demultiplexer (Dmux) 303, a first link power dispersion compensation module 302, a second link power dispersion compensation module 302', a first remote optical fiber dispersion compensation device 100, and a second remote optical fiber dispersion compensation device 100'.

As shown in FIG. 3, the first remote optical fiber dispersion compensation device 100 is located between the multiplexer 301 and the first link power dispersion compensation device 302, and the second remote optical fiber dispersion compensation device 100' is located between the demultiplexer 303 and the second link power dispersion compensation device 302', wherein, the multiplexer 301 is used for multiplexing the uplink transmission service signals to generate multiplexed service signals; the multiplexed service signals are performed dispersion compensation and power equalization of the remote distances of different channels after passing the first remote optical fiber dispersion compensation device 100', and the first link power dispersion compensation device 302 performs uniform dispersion compensation and power equalization on the transmission service signals.

The second link power dispersion compensation device 302' performs uniform dispersion compensation and power equalization on the downlink transmission service signals, and the downlink transmission signals after being performed uniform dispersion compensation and power equalization are performed dispersion compensation and power equalization of the remote distances of different channels by the second remote optical fiber dispersion compensation device 100', and are then sent into the demultiplexer 303 to demultiplex the downlink transmission services, so as to generate demultiplexed service signals.

The structures of the first remote optical fiber dispersion compensation device 100 and the second remote optical fiber dispersion compensation device 100' in FIG. 3 are as shown in FIG. 1 and FIG. 2, and can separately perform remote optical fiber dispersion compensation and power insertion loss adjustment on uplink services and downlink services, which are not repeated here.

The first power dispersion compensation module 302 and the second power dispersion compensation module 302' perform uniform dispersion compensation and power equalization on the transmitted service uplink or downlink services. Since the access optical fiber remote distances are different, the first remote optical fiber dispersion compensation device 100 and the second remote optical fiber dispersion compensation device 100' cause residual dispersion and spectral power inequality, and thus perform dispersion compensation of residual dispersion and insertion loss adjustment of channel spectral powers.

In the embodiment of the present disclosure, a remote optical fiber dispersion compensation device is inserted between the multiplexer and the demultiplexer of the remote access device and the power dispersion compensation device, by the wavelength selection switch, the compensation quantities of different channels are flexibly selected, by the dispersion compensation optical fibers preset with different lengths, the dispersion compensation is performed on the remote optical fiber transmissions and the insertion loss adjustment is performed on different channels, and thus, compensation and equalization of dispersion and power difference introduced by remote optical fibers with different lengths can be achieved.

The functional modules in the embodiments of the present disclosure may realize related functional modules through a hardware processor, the device embodiments described above are merely illustrative, wherein the units described as separate components may or may not be physically separate, and the components shown as units may or may not be physical units, i.e. may be located in one place, or may be distributed on multiple network units. Some or all of the modules may be selected according to actual needs to achieve the purpose of the solutions of the present embodiment. Those skilled in the art can understand and implement it without inventive labor.

Figure 4:
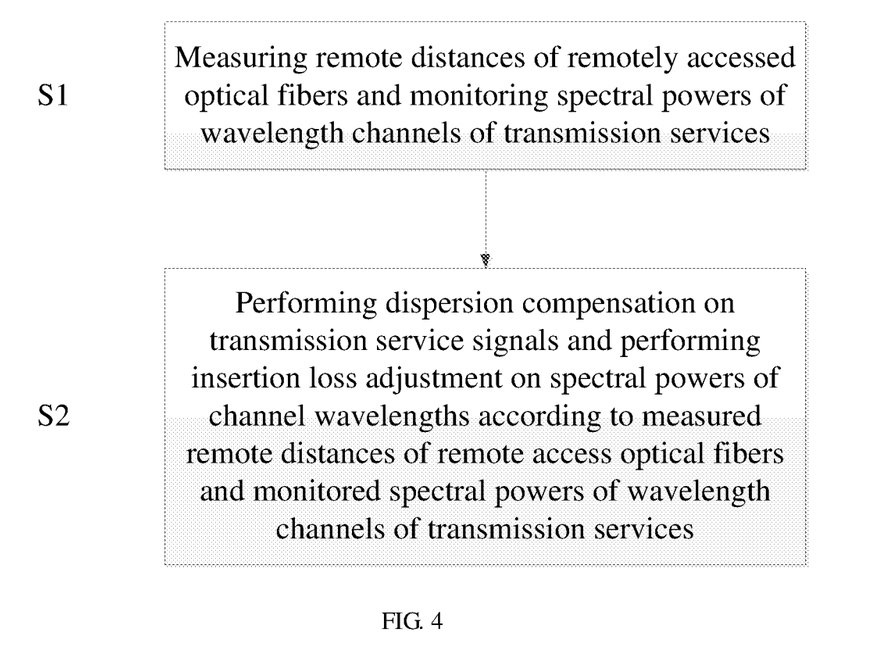
FIG. 4 is a schematic flow diagram of a remote optical fiber dispersion compensation method according to yet another embodiment of the present disclosure.

FIG. 4 shows a schematic flow diagram of a remote optical fiber dispersion compensation method according to yet another embodiment of the present disclosure.

Referring to FIG. 4, the method provided by the embodiment of the present disclosure specifically includes the following steps:

Step 1: measuring remote distances of remotely accessed optical fibers and monitoring spectral powers of wavelength channels of transmission services;

Step 2: performing dispersion compensation on transmission service signals and performing insertion loss adjustment on the channels according to the measured remote distances of the remote access optical fibers and the monitored spectral powers of the wavelength channels of the transmission services.

Wherein, performing dispersion compensation on the transmission services includes: dividing the wavelength channels for transmitting the services into N groups according to the remote distances of the remotely accessed optical fibers, and inputting the service signals transmitted by the N groups of wavelength channels to the N dispersion compensation optical fibers preset with different lengths to perform dispersion compensation for the transmission service signals, wherein N is an integer greater than 1.

In the remote optical fiber dispersion compensation method provided by the embodiment of the present disclosure, by the wavelength selection switch, the compensation quantities of different channels are flexibly selected, by the dispersion compensation optical fibers preset with different lengths, the dispersion compensation is performed on the remote optical fiber transmissions and the insertion loss adjustment is performed on different channels, and thus, compensation and equalization of dispersion and power difference introduced by different remote optical fiber lengths can be achieved.

In yet another embodiment of the present disclosure, an electronic device is also provided, which includes a memory, a processor, and a computer program stored in the memory and capable of operating on the processor, and the processor implements the method shown in FIG. 4 when executing the program.

Figure 5:
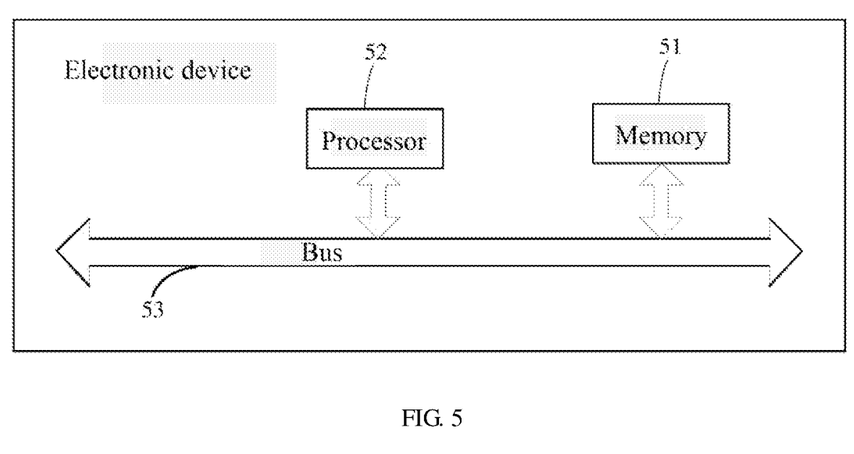
FIG. 5 is a schematic structural diagram of an electronic device according to an embodiment of the present disclosure.

FIG. 5 shows a schematic structural diagram of an electronic device provided by an embodiment of the present disclosure.

As shown in FIG. 5, the electronic device provided by the embodiment of the present disclosure includes a memory 51, a processor 52, a bus 53 and a computer program stored in the memory 51 and capable of operating on the processor 52. Wherein, the memory 51 and the processor 52 communicate with each other through the bus 53.

The processor 52 is used for invoking program instructions in the memory 51 to implement the method as shown in FIG. 4 when executing the program.

For example, the processor implements the following method when executing the program:

measuring remote distances of the remotely accessed optical fibers and monitoring spectral powers of the transmission service wavelength channels; and performing dispersion compensation on the transmission service signals and performing insertion loss adjustment on the channels according to the measured remote distances of the remote access optical fibers and the monitored spectral powers of the transmission service wavelength channels. Wherein, performing dispersion compensation on the transmission services includes: dividing the wavelength channels for transmitting the services into N groups according to the remote distances of the remotely accessed optical fibers, and inputting the service signals transmitted by the N groups of wavelength channels to the N dispersion compensation optical fibers preset with different lengths to perform dispersion compensation for the transmission service signals, wherein N is an integer greater than 1.

In the electronic device provided by the embodiment of the present disclosure, by the wavelength selection switch, the compensation quantities of different channels are flexibly selected, by the dispersion compensation optical fibers preset with different lengths, the dispersion compensation is performed on the remote optical fiber transmissions and the insertion loss adjustment is performed on different channels, and thus, compensation and equalization of dispersion and power difference introduced by remote optical fibers with different lengths can be achieved.

In the embodiment of the present disclosure, also provides a non-transient computer-readable storage medium having a computer program stored thereon, and the computer program implements the method as shown in FIG. 4 when being executed by a processor.

For example, the processor implements the following method when executing the program:

measuring remote distances of the remotely accessed optical fibers and monitoring spectral powers of the wavelength channels of the transmission services; and performing dispersion compensation on the transmission service signals and performing insertion loss adjustment on the channels according to the measured remote distances of the remote access optical fibers and the monitored spectral powers of the transmission service wavelength channels. Wherein, performing dispersion compensation on the transmission services includes: dividing the wavelength channels for transmitting the services into N groups according to the remote distances of the remotely accessed optical fibers, and inputting the service signals transmitted by the N groups of wavelength channels to the N dispersion compensation optical fibers preset with different lengths to perform to perform remote optical fiber dispersion compensation for the transmission service signals, wherein N is an integer greater than 1.

Through the dispersion compensation optical fibers preset with different lengths, the non-transient computer-readable storage medium provided by the embodiment of the present disclosure performs dispersion compensation on the remote optical fiber transmissions and performs the insertion loss adjustment on different channels, and thus, compensation and equalization of dispersion and power difference introduced by the remote optical fibers with different lengths can be achieved.

A computer program product is disclosed in yet another embodiment of the present disclosure, the computer program product comprises a computer program stored on a non-transient computer-readable storage medium, and the computer program includes program instructions, and when the program instructions are executed by a computer, the computer can execute the method provided in the foregoing each method embodiment, for example, including:

measuring remote distances of the remotely accessed optical fibers and monitoring spectral powers of the wavelength channels of the transmission services; and performing dispersion compensation on the transmission service signals and performing insertion loss adjustment on the channels according to the measured remote distances of the remote access optical fibers and the monitored spectral powers of the transmission service wavelength channels. Wherein, performing dispersion compensation on the transmission services includes: dividing the wavelength channels for transmitting the services into N groups according to the remote distances of the remotely accessed optical fibers, and inputting the service signals transmitted by the N groups of wavelength channels to the N dispersion compensation optical fibers preset with different lengths to perform dispersion compensation for the transmission service signals, wherein N is an integer greater than 1.

Those skilled in the art can understand that although some embodiments described herein include certain features included in other embodiments but not other features, the combination of features of different embodiments means that it falls within the scope of the present disclosure and forms different embodiments.

Through the description of the above implementation manners, those skilled in the art can clearly understand that each implementation can be implemented by means of software plus necessary general hardware platform, and of course, it can also be implemented by hardware. Based on such understanding, the above technical solution essentially or the part that contributes to the prior art can be embodied in the form of a software product, and the computer software product can be stored in a computer-readable storage medium, such as ROM/RAM, a magnetic disc, and an optical disc, etc., and include a number of instructions used for making a computer device (which may be a personal computer, a server, or a network device, and so on) execute the methods described in each embodiment or some parts of the embodiments.

Finally, it should be noted that the above embodiments are only used to illustrate the technical solutions of the present disclosure, not to limit it; although the present disclosure has been described in detail with reference to the embodiments as mentioned above, it will be understood by those of ordinary skill in the art that modifications may be made to the technical solutions described in the embodiments as mentioned above, or equivalents thereof may be substituted for some of the technical features thereof; however, these modifications or replacements do not cause the essence of the corresponding technical solutions to deviate from the spirit and scope of the technical solutions of the embodiments of the present disclosure.

What is claimed is:

1. A remote optical fiber dispersion compensation device, characterized in comprising:
   a distance measurement module, which is used for measuring remote distance to each of wavelength channels in remote access optical fibers;
   a channel monitoring module, which is used for monitoring spectral power of each of wavelength channels of transmission service signals;
   a remote optical fiber dispersion power equalization module, which is used for performing dispersion compensation on transmission service signals in each of the wavelength channels and performing insertion loss adjustment on each of the wavelength channels according to the measured remote distance of each of the wavelength channels and the monitored spectral power of each of the wavelength channels;
   wherein the remote optical fiber dispersion power equalization module comprises a wavelength selection switch and N dispersion compensation optical fibers preset with different lengths;
   each of the wavelength channels for the transmission service signals is divided into N groups according to the remote distance of each of the wavelength channels in the remote access optical fibers to determine corresponding dispersion compensation quantity of the transmission service signals in each group of the wavelength channels in the N groups of wavelength channels;
   the wavelength selection switch inputs transmission service signals in each group of the wavelength channels in the N groups of wavelength channels correspondingly and respectively into the N dispersion compensation optical fibers preset with different lengths to perform dispersion compensation for transmission service signals according to corresponding dispersion compensation quantity of each group of the wavelength channels; wherein N is an integer greater than 1.

2. The device of claim 1, the channel monitoring module inputting the monitored spectral power of each of the wavelength channels to the wavelength selection switch to perform insertion loss adjustment on each of the wavelength channels.

3. The device of claim 1, the wavelength selection switch being a 1×N wavelength selection switch, the wavelength selection switch distributing the transmission service signals of the N groups of wavelength channels to N ports, and the N dispersion compensation optical fibers preset with different lengths being connected with N ports of the wavelength selection switch to perform dispersion compensation for the transmission service signals.

4. The device of claim 3, the remote optical fiber dispersion power equalization module comprising an uplink module and a downlink module; wherein the uplink module comprises a first amplifier, a first optical circulator, a first 1×N wavelength selection switch, a first N dispersion compensation optical fibers preset with different lengths, and a second amplifier;
   wherein uplink transmission service signals are injected into the first 1×N wavelength selection switch through the first optical circulator after passing through the first amplifier, and the uplink transmission service signals are reflected back to the first wavelength selection switch after being performed dispersion compensation by the first N dispersion compensation optical fibers preset with different lengths, and then are injected into the second amplifier through the first optical circulator;
   the downlink module comprises a third amplifier, a second optical circulator, a second 1×N wavelength selection switch, a second N dispersion compensation optical fibers preset with different lengths, and a fourth amplifier;
   wherein downlink transmission service signals are injected into the second 1×N wavelength selection switch through the second optical circulator after passing through the third amplifier, and the downlink transmission service signals are reflected back to the second 1×N wavelength selection switch after being performed dispersion compensation by the second N dispersion compensation optical fibers preset with different lengths, and then are injected into the fourth amplifier through the second optical circulator.

5. A remote access device, comprising: a multiplexer, a first link power dispersion compensation module, a second link power dispersion compensation module, a demultiplexer, and a first remote optical fiber dispersion compensation device and a second remote optical fiber dispersion compensation device according to any one of claims 1, or 2 to 4, the first remote optical fiber dispersion compensation device being located between the multiplexer and the first link power dispersion compensation device, the second remote optical fiber dispersion compensation device being located between the demultiplexer and the second link power dispersion compensation device, wherein,
   the multiplexer is used for multiplexing uplink transmission service signals to generate multiplexed service signals; the multiplexed service signals are performed dispersion compensation and power equalization of remote distances of different channels after passing the first remote optical fiber dispersion compensation device, and the first link power dispersion compensation device performs uniform dispersion compensation and power equalization on the uplink transmission service signals;
   the second link power dispersion compensation device performs uniform dispersion compensation and power equalization on the downlink transmission service signals, the downlink transmission service signals after being performed uniform dispersion compensation and power equalization are performed dispersion compensation and power equalization of remote distances of different channels by the second remote optical fiber dispersion compensation device, and then are sent into the demultiplexer to demultiplex the downlink transmission services, so as to generate demultiplexed service signals.

6. A remote optical fiber dispersion compensation method, characterized in comprising:
   measuring remote distance of each of wavelength channels in remotely accessed optical fibers and monitoring spectral power of each of wavelength channels of transmission service signals;
   performing dispersion compensation on transmission service signals in each of the wavelength channels and performing insertion loss adjustment on each of the wavelength channels according to the measured remote distance of each of the wavelength channels and the monitored spectral power of each of the wavelength channels;

the performing dispersion compensation on transmission service signals in each of the wavelength channels comprising:

dividing each of the wavelength channels for the transmission service signals into N groups according to the remote distance of each of the wavelength channels in the remotely accessed optical fibers to determine corresponding dispersion compensation quantity of the transmission service signals in each group of the wavelength channels in the N groups of wavelength channels;

inputting transmission service signals of each group of the wavelength channels the N groups of wavelength channels correspondingly and respectively into N dispersion compensation optical fibers preset with different lengths by a wavelength selection switch to perform dispersion compensation for the transmission service signals according to corresponding dispersion compensation quantity of each group of the wavelength channels, wherein N is an integer greater than 1.

7. An electronic device, which comprises a memory, a processor, and a computer program stored in the memory and capable of operating on the processor, characterized in that the processor implements the remote optical fiber dispersion compensation method according to claim 6 when executing the program.

8. A non-transient computer-readable storage medium having a computer program stored thereon, characterized in that the computer program implements the remote optical fiber dispersion compensation method according to claim 6 when being executed by a processor.

* * * * *